United States Patent
Stone et al.

(10) Patent No.: US 7,483,605 B2
(45) Date of Patent: Jan. 27, 2009

(54) METHODS FOR OPTICAL ATTENUATION AND SWITCHING OPTICAL BEAMS

(75) Inventors: Thomas W. Stone, Hellertown, PA (US); John C. Kralik, Devon, PA (US)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 11/960,217

(22) Filed: Dec. 19, 2007

(65) Prior Publication Data

US 2008/0106783 A1 May 8, 2008

Related U.S. Application Data

(62) Division of application No. 10/720,816, filed on Nov. 24, 2003, now Pat. No. 7,333,685.

(51) Int. Cl.
*G02B 6/34* (2006.01)
*G03H 1/00* (2006.01)
(52) U.S. Cl. .......................................... 385/37; 359/34
(58) Field of Classification Search ............... 385/37; 359/34
See application file for complete search history.

(56) References Cited

U.S. PATENT DOCUMENTS

| | | | |
|---|---|---|---|
| 5,692,077 | A | 11/1997 | Stone et al. |
| 5,771,320 | A | 6/1998 | Stone |
| 6,166,838 | A | 12/2000 | Liu et al. |
| 6,563,974 | B2 | 5/2003 | Agha Riza |
| 6,567,573 | B1 | 5/2003 | Domash et al. |
| 6,585,382 | B1 | 7/2003 | Stone |
| 2001/0033400 | A1 | 10/2001 | Sutherland et al. |

OTHER PUBLICATIONS

U.S. Appl. No. 10/668,975, filed Sep. 23, 2003, Applicant: John C. Kralik et al. Title: Polarization Insensitive Optical Switching and Routing Systems and Methods of Maunfacturing and Operation.

*Primary Examiner*—Frank G Font
*Assistant Examiner*—Erin D Chiem

(57) ABSTRACT

Low loss, reliable variable optical attenuators and 1×2 switches and polarization insensitive low loss, reliable variable optical attenuators and 1×2 optical switches are described. In one embodiment, a system of the present invention includes a polarization separating sub-system a polarization recombining sub-system and one or more switchable volume diffraction gratings to provide polarization insensitive low loss, reliable variable optical attenuators and 1×2 optical switches.

7 Claims, 3 Drawing Sheets

METHODS FOR OPTICAL ATTENUATION AND SWITCHING OPTICAL BEAMS

This application is a divisional of co-pending application Ser. No. 10/720,816, filed on Nov. 24, 2003, the entire disclosure of which is hereby incorporated herein by reference.

FIELD OF THE INVENTION

The present invention relates generally to interconnection and switching systems, and, more particularly, to optical switching/routing (interconnecting) systems which incorporate the use of selectable switching and routing components.

BACKGROUND OF THE INVENTION

In many current and future systems light beams are modulated in a digital and/or analog fashion and are used as "optical carriers" of information. There are many reasons why light beams or optical carriers may be preferred in these applications. For example, as the data rate required of such channels increases, the high optical frequencies provide a tremendous improvement in available bandwidth over conventional electrical channels such as formed by wires and coaxial cables. In addition, the energy required to drive and carry high bandwidth signals can be reduced at optical frequencies. Furthermore, optical channels, even those propagating in free space (without waveguides such as optical fibers) can be packed closely and even intersect in space with greatly reduced crosstalk between channels.

Optical attenuators perform numerous tasks associated with optical signal transmission systems. one function of an attenuator is to reduce the intensity of an optical signal which enters a photosensitive component. Photosensitive components are affected by variations in light intensity. Therefore, an attenuator causes the light intensity to be within the dynamic range of the photosensitive components. By using an attenuator, damage to the component is precluded. Additionally, the component does not become insensitive to small changes in the optical signal.

In other applications, attenuators serve as noise discriminators by reducing the intensity of spurious signals received by the optical device to a level below the device's response threshold. Moreover, optical attenuators are used to reduce the power of optical signals from an input fiber to an output fiber, and especially to balance optical power between several lines of an optical system. Many optical attenuators are also capable of actively attenuating an optical signal. Variable attenuators are required in some applications where different optical components require dissimilar incident optical signals, and hence variable sensitivities and saturation points. A fixed (i.e., passive) attenuation device is impractical for this purpose.

Attenuators serve to maintain the light level at a constant to compensate for component aging i.e., loss of efficiency in fiber amplifiers and reduced laser output from source, and changing absorption in optical waveguides. Variable attenuators serve to control feedback in optical amplifier control loops to maintain a constant output (e.g., as an automatic gain control element (AGC)).

Some variable attenuator designs require mechanical components or a number of optical components. Both of this type of attenuators exhibit a number of characteristics that are not desirable, such as high manufacturing and assembly costs, reduced reliability and extreme sensitivity to alignment.

There is a need for low loss, reliable variable optical attenuators.

A common problem encountered in applications in which high data rate information is modulated on optical carrier beams is the switching of the optical carriers from among an array of channels. These differing optical channels may represent, for example, routes to different processors, receiver locations, or antenna element modules. One approach to accomplish this switching is to extract the information from the optical carrier, use conventional electronic switches, and then re-modulate an optical carrier in the desired channel. However, from noise, space, and cost perspectives it is sometimes more desirable to directly switch the route of the optical carrier from the input channel to the desired channel, without converting to and from the electronic (or microwave) regimes.

A problem that is typical in optical switching systems is the insertion loss they impose. Some switching systems divide the input signal power into many parts, and block (absorb) the ones that are not desired. Others use switches that are inefficient and absorb, scatter, or divert a significant part of the input signal.

A commonly utilized optical switch is a one input, two output switch, also referred to as a 1×2 switch. There is a need for low loss, reliable 1×2 switches.

It is one object of this invention to provide polarization insensitive variable optical attenuators and 1×2 switches.

It is another object of this invention to provide low loss, reliable 1×2 switches.

It is a further object of this invention to provide low loss, reliable variable optical attenuators.

BRIEF SUMMARY OF THE INVENTION

The objects set forth above as well as further and other objects and advantages of the present invention are achieved by the embodiments of the invention described hereinbelow and set out in the claims appended hereto.

Low loss, reliable variable optical attenuators and 1×2 switches and polarization insensitive low loss, reliable variable optical attenuators and 1×2 optical switches are disclosed in the present invention.

In one embodiment, a system of the present invention includes a polarization separating sub-system a polarization recombining sub-system and one or more switchable volume diffraction gratings to provide polarization insensitive low loss, reliable variable optical attenuators and 1×2 optical switches. The polarization separating sub-system is optically disposed to receive an input optical beam of arbitrary polarization and is also capable of separating the input optical beam into a first optical beam of a first polarization and a second optical beam of a second distinct, orthogonal polarization. The polarization separating sub-system is also capable of emitting a first emitted optical beam of the first polarization and a second emitted optical beam of the first polarization, the emitted first and emitted second optical beams constituting an input channel of the first polarization. The one or more switchable volume diffraction gratings are optically disposed to receive the input channel and are also capable of providing one or more transmitted channels. The one or more transmitted channels include at least one transmitted optical beam of the first polarization and at least one other transmitted optical beam of the first polarization. The polarization recombining sub-system is optically disposed to receive the at least one transmitted optical beam of the first polarization and the at least one other transmitted optical beam of the first polarization and is capable of recombining the at least one transmitted optical beam of the first polarization and the at least one other transmitted optical beam of the first polarization into at least one final output beam of combined polarization.

For a better understanding of the present invention, together with other and further objects thereof, reference is made to the accompanying drawings and detailed description and its scope will be pointed out in the appended claims.

DETAILED DESCRIPTION OF THE PREFERRED EMBODIMENTS

In order to better understand the present invention described below, it should be noted that certain terms used in the description of the invention have been used interchangeably.

In the following descriptions of the present invention, the terms such as "light" and "optical radiation" may be used interchangeably, and these terms both include electromagnetic radiation over the entire spectrum of wavelengths such as, for example, ultraviolet, visible, and infrared. Also, the term "optical", for example, as applied to components and systems, refers not only to optical components and systems, but also to electro-optical components and systems.

Furthermore, terms such as "beams" and "channels" may also be interchanged, in certain instances, based upon their usage as recognized in the art.

Low loss, reliable variable optical attenuators and 1×2 switches and polarization insensitive low loss, reliable variable optical attenuators and 1×2 optical switches are disclosed hereinbelow.

Figure 1:
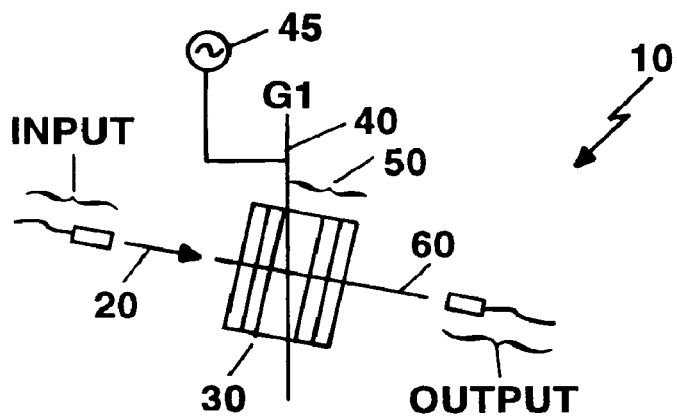
FIG. 1 is a pictorial, schematic representation of an embodiment of a variable optical attenuator of this invention.

FIG. 1 shows a pictorial, schematic representation of an embodiment of a variable optical attenuator (VOA) of this invention. The embodiment shown in FIG. 1 operates in a configuration herinafter called the normally-off configuration. In one embodiment the input optical beam 20 is derived from a single-mode (SM) fiber that is coupled to a collimating lens. Other embodiments derive the input beam from collimated free space beams or collimated sources. The input optical beam 20 is a beam of arbitrary polarization. The beam 20 is received by (enters) a polarization separating sub-system 30 (also referred to as a polarization diversity filter, or a compensator), which separates the input optical beam 20 into a first optical beam of a first polarization and a second optical beam of a second polarization, the second polarization being distinct from the first polarization (in one embodiment, the two polarizations are s- and p components). The polarization separating sub-system 30 is capable of emitting a first emitted optical beam of the first polarization and a second emitted optical beam of the first polarization (in one embodiment, the emitted beams are p-polarized). The emitted first and emitted second optical beams constitute an input channel of the first polarization. One or more switchable volume diffraction gratings 40 (one in the embodiment shown in FIG. 1) are optically disposed to receive the input channel and are capable of providing a transmitted channel. The transmitted channel includes a first transmitted optical beam of the first polarization and a second transmitted optical beam of the first polarization. A polarization recombining sub-system 50 is optically disposed to receive the first transmitted optical beam of the first polarization and the second transmitted optical beam of the first polarization and is capable of recombining the first transmitted optical beam of the first polarization and the second transmitted optical beam of the first polarization into a final output beam 60 of combined polarization.

One embodiment of the switchable volume diffraction grating element utilized in the variable optical attenuators/1×2 switches of this invention is the switchable diffraction element (grating) such as that described in U.S. Pat. No. 5,771,320, herein incorporated by reference. The embodiments of the optical switching and routing systems described in U.S. Pat. No. 5,771,320 utilize volume phase diffraction (holographic) gratings that permit switching of the incident energy between two or more orders. The primary mechanisms considered which permit this diffracted-order switching are electrical switching, optical switching, thermal switching, and polarization switching. The switched gratings can be optically switched, electrically switched, polarization switched, or switched based on other mechanisms. Currently it is preferred that electrical and polarization switching techniques are used with the present invention since they are extremely fast (for example, switching times in the microsecond regime). Electrical switching can be obtained in materials such as liquid crystal-imbibed Polaroid DMP-128 photopolymer (as described below) or, for example, polymer dispersed liquid crystals. So as to provide an example of a switching mechanism, one of the electrical switching techniques is described below. Further, switching to intermediate diffraction efficiency status permits switching of a given input signal to more than one output channel ("fan out" as opposed to "one to one" switching).

It has been previously demonstrated in the literature that high efficiency volume diffraction gratings which are recorded in permeable media, such as the DMP-128 photopolymer manufactured by Polaroid Corporation, Cambridge, Mass., can be made to be rapidly switchable between high and low diffraction efficiency states under electric control by imbibing the structure with nematic liquid crystals. In this technique the crystals are rotated by the applied electric field and their refractive index is switched between ordinary and extraordinary values. By choosing the materials so that one of these switchable values matches that of the host grating material, the grating modulation is effectively switched "off" and "on," thus switching the diffraction efficiency of the gratings and toggling the diffracted beam between the 0 and first diffracted order.

In some embodiments of the switchable volume diffraction grating, input beams of electromagnetic radiation with polarization in a predetermined plane of polarization are diffracted by the enabled grating. A substantially polarization insensitive variable optical attenuator (VOA)/1×2 switch can be obtained from the systems of this invention, even with polarization sensitive embodiments of the switchable gratings.

Embodiments of polarization separating/recombining sub-systems are described in U.S. patent application Ser. No. 10/668,975, filed on Sep. 23, 2003, incorporated by reference herein. As described in U.S. patent application Ser. No. 10/668,975, one embodiment of the polarization separating/recombining sub-system includes a polarizing beam-splitter and a patterned polarization converter. Other embodiments can also be utilized in the present invention.

During operation of the normally-off configuration of the embodiment shown in FIG. 1, in the off-state (i.e. where the grating 40 is diffracting or "on") the grating 40 diffracts light into the first-order with high diffraction efficiency, and very little light propagates to the VOA output 60. In the on-state (i.e. where the grating 40 is non-diffracting or "off"), the optical beam propagates through the grating 40 with very little loss and eventually, exits the VOA to the output 60. Since the diffraction efficiency of a switchable transmission volume grating varies continuously with applied voltage, the output optical power of the VOA of this invention is therefore continuously variable.

A common mode for switchable gratings fabricated using PDLC materials is to be diffracting when un-powered and non-diffracting when powered. For VOAs, it is often important to know the state of the devices in case of a power failure. If a VOA of FIG. 1 was made using such a grating, a lack of electrical power would leave the grating in a diffracting state, with little or no optical power transmitted to the output, and thus this configuration has been termed a "normally-off" configuration. It should also be noted that it is also possible to fabricate switched gratings, including PDLC switched gratings, so that they are non-diffracting without applied electrical power, and diffracting when powered. When this alternative type of switched grating is used with the configurations of this invention, the sense of "normally-off" and "normally-on", as used herein, are reversed.

It should be noted the voltage is only one embodiment of the means for controlling the switching of the switchable grating 40. Other embodiments exist for optical switching and for polarization switching.

It should also be noted that for the VOA configuration of FIG. 1, additional switched gratings 40 may be cascaded and simultaneously switched to partial diffraction efficiencies in order to extend the depth of available attenuation, if desired.

Figure 2A:
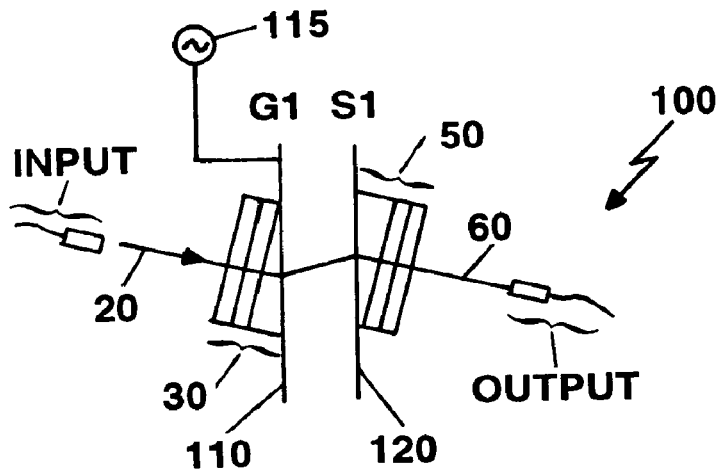
FIGS. 2a-2b are pictorial, schematic representations of another embodiment of a variable optical attenuator of this invention.
Figure 2B:
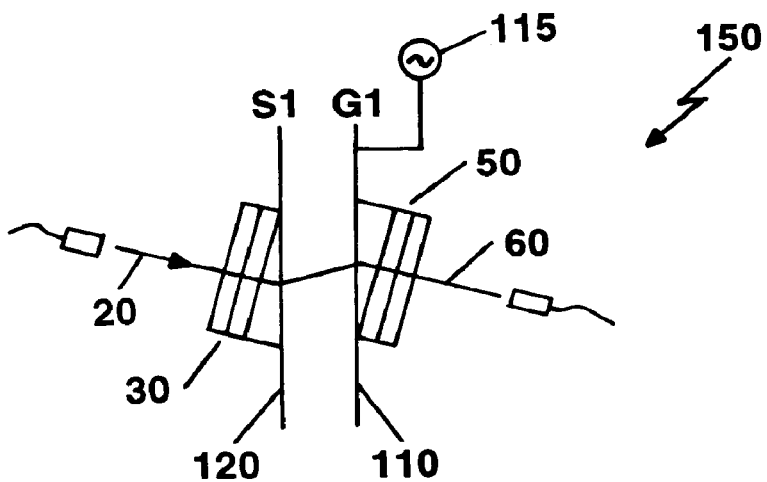

Shown in FIGS. 2a-2b are pictorial, schematic representations of other embodiments of a variable optical attenuator of this invention. FIG. 2a shows an embodiment of a variable optical attenuator of this invention including a polarization separating sub-system 30, a switchable volume diffraction grating 110, a static grating 120, and a polarization recombining sub-system 50. The static grating 120 can be, in one embodiment, a volume diffraction grating that is non-switchable.

The configurations of the embodiments shown in FIGS. 2a and 2b typically operate as "normally-on" configurations. Again, this nomenclature is based on the assumption of using common switched gratings 110 that are diffracting with no switching power applied, and non-diffracting when power is applied, The input optical beam 20 is a beam of arbitrary polarization. The beam 20 is received by (enters) a polarization separating sub-system 30 (also referred to as a polarization diversity filter, or a compensator), which separates the input optical beam 20 into a first optical beam of a first polarization and a second optical beam of a second polarization, the second polarization being distinct from the first polarization. The polarization separating sub-system 30 is capable of emitting a first emitted optical beam of the first polarization and a second emitted optical beam of the first polarization. The emitted first and emitted second optical beams constitute an input channel of the first polarization.

In the normally-on configuration of FIG. 2a, the input channel encounters the switchable volume diffraction grating 110 and is diffracted into the first-order when no voltage is applied across the grating. The input channel is then diffracted to the polarization recombining sub-system 50 by the static grating 120. The diffracted channel includes a first transmitted optical beam of the first polarization and a second transmitted optical beam of the first polarization. A polarization recombining sub-system 50 is optically disposed to receive the first transmitted optical beam of the first polarization and the second transmitted optical beam of the first polarization and is capable of recombining the first transmitted optical beam of the first polarization and the second transmitted optical beam of the first polarization into a final output beam 60 of combined polarization. When an appropriate voltage (in the electrical switching embodiment) is applied across the switchable volume diffraction grating 110, the input channel is transmitted (not diffracted) through switchable grating 110 and is not coupled into the output at the location shown in FIG. 2a. Since the diffraction efficiency of a switchable transmission volume grating varies continuously with applied voltage, varying the voltage of the control signal on switchable grating 110 varies the percentage of the optical power of the input channel that is diffracted to the output 60, and therefore the output optical power of the VOA of this invention is continuously variable.

It should be noted that embodiments operating in the normally-off configuration are also possible. For example, if a switchable grating that is transmitting with no applied power (and diffracting with applied power) is used as grating 110 in FIG. 2a, the configuration will operate as normally-off.

It should be noted that since the switchable gratings can be optically switched, electrically switched, polarization switched, or switched based on other mechanisms, the switching controls (voltage, or optical or polarization control) are means for varying the diffraction efficiency of the switchable gratings.

Shown in FIG. 2b is an embodiment of the VOA system of this invention in which the input channel encounters the static grating 120 first and then encounters the switchable transmission volume grating 110. The operation of the VOA system of this invention shown in FIG. 2b is analogous to that of the VOA system of this invention in FIG. 2a.

It should also be noted that switchable gratings in addition to switchable gratings 110 could replace the static grating 120 in FIGS. 2a and 2b. This allows, for example, for additional degrees of attenuation of the input signal if required. For example, consider the configuration of FIG. 2a. If static grating 120 is replaced by a switchable grating, it can be set to a diffracting state and the operation of the VOA is as described above. However, if it is desired to heavily attenuate the output channel, both the switchable grating replacing static grating 120 and switchable grating 110 can be switched to non-diffracting states. In such a configuration, if the switchable gratings give a 25 dB contrast between diffracting and non-diffracting states, switching both gratings can provide a roughly 50 dB optical attenuation level to the output. This approximately doubles the dBs of attenuation available by switching only a single grating.

Figure 3:
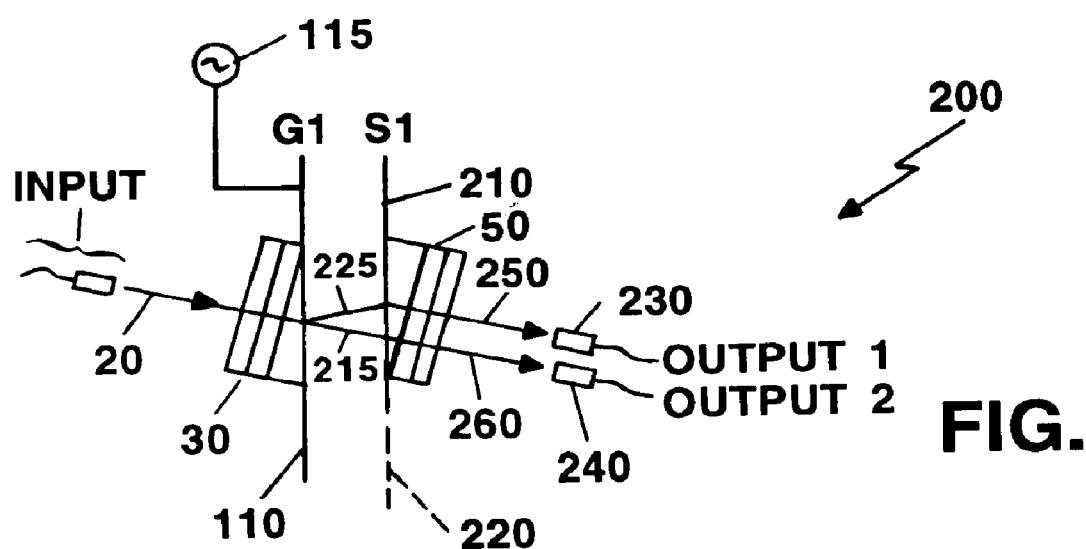
FIG. 3 is a pictorial, schematic representation of an embodiment of a 1×2 optical switch of this invention.

FIG. 3 shows a pictorial, schematic representation of an embodiment 200 of a 1×2 optical switch of this invention. The embodiment 200 of the 1×2 optical switch of this invention includes a polarization separating sub-system 30, a switchable volume diffraction grating 110, a static grating 210, and a polarization recombining sub-system 50. The static grating 210 includes a transparent region 220.

As in the embodiment of FIG. 2a, the input optical beam 20 is a beam of arbitrary polarization. The input beam 20 is received by (enters) the polarization separating sub-system 30 (also referred to as a polarization diversity filter, or a compensator), which separates the input optical beam 20 into a first optical beam of a first polarization and a second optical beam of a second polarization, the second polarization being distinct from the first polarization. The polarization separating sub-system 30 is capable of emitting a first emitted optical beam of the first polarization and a second emitted optical beam of the first polarization. The emitted first and emitted second optical beams constitute an input channel of the first polarization.

During operation of the 1×2 switch 200 of this invention, the input channel is incident on the switchable volume diffraction grating 110. The switchable grating 110 is set to either fully diffracting, fully transmitting, or some intermediate state of diffraction efficiency by the control 115 (voltage, in one embodiment). The fraction of the input channel that is undiffracted by switchable grating 110 is transmitted through switched grating 110 as transmitted beams 215. These beams are then incident on the transparent region 220 of static grating 210, where they are again transmitted as beams 215.

Similarly the fraction of the input channel that is diffracted by switchable grating 110 propagates as diffracted beams 225. These diffracted beams 225 are then incident on the static diffraction grating 210 and are diffracted by grating 210.

A polarization recombining sub-system 50 is optically disposed to receive the transmitted beams 215 and the diffracted beams 225. The transmitted beams 215 and the diffracted beams 225 each includes a first optical beam of the first polarization and a second optical beam of the first polarization. The polarization recombining sub-system 50 is capable of recombining the first optical beam of the first polarization and the second optical beam of the first polarization for each of beams 215 and 225 into two final output beams 260 and 250, respectively, of combined polarization. In one embodiment the 1×2 switch 200 of this invention includes two output beam ports 230, 240 (for example, two collimator/single mode fiber combinations). The two output beam ports 230, 240 receive two final output beams 250, 260 of combined polarization.

Since the diffraction efficiency of switchable diffraction grating 110 can be varied in a continuously varying manner using control 115 (electrical in one embodiment), variable amounts of the optical power in input 20 can be switched among outputs 230 and 240. This also includes the cases where substantially all of the input power is switched to either output 230 or to output 240. For the case where it is desired to switch all of the incident power to only one of the outputs at a time, it may be advantageous to replace static grating 210 and transparent region 220 by a single switched grating. In such a case, when it is desired to send all of the power to output 230, both switchable gratings could be set to fully diffracting. This would not only route substantially all of the power to the desired output, but any input signal leaking through the first switchable grating as undiffracted light, would be additionally attenuated from being crosstalk in the output 240 by diffraction from the second switchable grating. Similarly, when setting the switch to direct substantially all of the power to the output 240, both switched gratings would be set non-diffracting. This would not only direct substantially all of the input power to the output 240, but any input signal leaking through the first grating as diffracted light will be further attenuated from being crosstalk in the output 250 by the non-diffracting second grating.

If the embodiment of the switchable diffraction grating is not polarization sensitive, i.e., if it diffracts with the same diffraction efficiency regardless of the state of the incident polarization, then the polarization separating sub-systems 30 and the polarization combining sub-systems 50 of the configurations of FIGS. 1-3 are not necessary. Similarly, if the embodiment of the switchable diffraction gratings switch a single polarization, but that polarization is the only one incident on the system, then the polarization separating sub-systems 30 and the polarization combining sub-systems 50 of the configurations of FIGS. 1-3 are not necessary.

For example, if the embodiment of the switchable volume diffraction grating is such that beams of electromagnetic radiation with polarization in a predetermined plane of polarization are diffracted by the enabled grating and if the input beam 20 has a polarization in that predetermined plane of polarization, the polarization separating sub-system 30 and the polarization recombining sub-system 50 are not necessary and can be omitted from the system of this invention. Systems of this invention in which the input beam 20 has a polarization in the predetermined plane of polarization in which the switchable volume diffraction grating 110 preferably operates are shown in FIGS. 4a, 4b and 5.

Figure 4A:
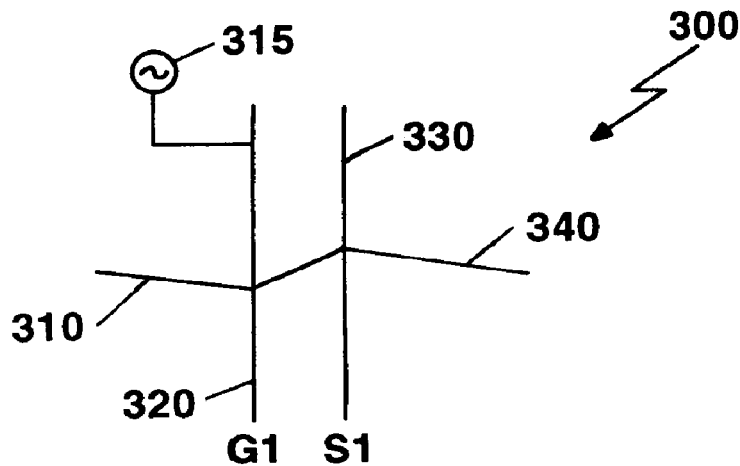
FIGS. 4a-4b are pictorial, schematic representations of yet another embodiment of a variable optical attenuator of this invention; and, FIG. 5 is a pictorial, schematic representation of another embodiment of a 1×2 optical switch of this invention.

During operation of the embodiment of FIG. 4a, when the switchable volume diffraction grating 320 is enabled (either by its initial state or by a switching control such as a voltage), the input beam encounters the switchable volume diffraction grating 320 and is diffracted. The diffracted beam is then further diffracted by the static grating 330 resulting in output beam 340. Since the diffraction efficiency of the switchable transmission volume grating varies continuously with applied voltage (switching control), the percentage of the optical power of the input channel that is diffracted to the output 340, and therefore the output optical power of the VOA of this invention, is continuously variable.

Figure 4B:
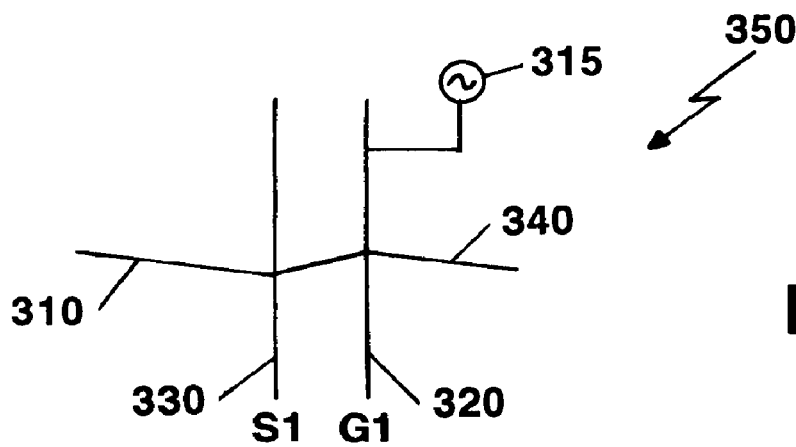

During operation of the embodiment of FIG. 4b, when the switchable volume diffraction grating 320 is enabled (either by its initial state or by a switching control such as a voltage), the input beam 310 encounters the static grating 330 and is diffracted. The diffracted beam then encounters the switchable volume diffraction grating 320 and is diffracted resulting in output beam 340.

Figure 5:
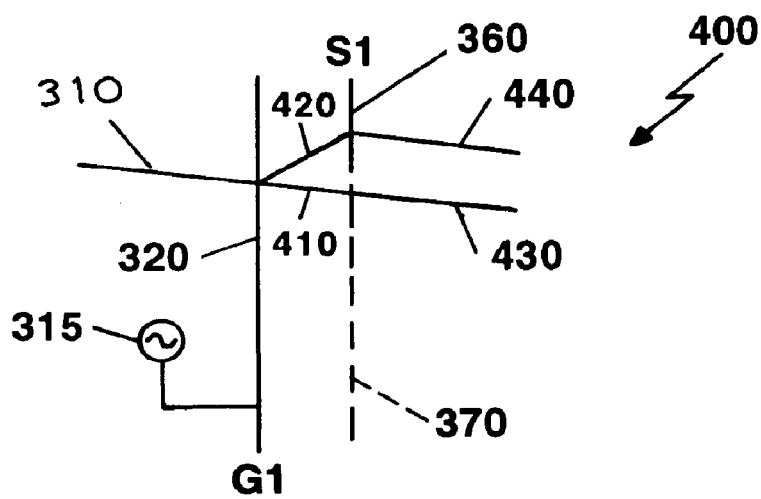

FIG. 5 shows an embodiment 400 of the 1×2 switch of this invention in which the input beam 310 has a polarization in the predetermined plane of polarization in which the switchable volume diffraction grating 320 preferably operates. During operation of the embodiment 400 of FIG. 5, when the switchable volume diffraction grating 320 is enabled (either by its initial state or by a switching control such as a voltage), the input beam encounters the switchable volume diffraction grating 320 and its optical power is divided among transmitted beam 410 and diffracted beam 420. Diffracted beam 420 is further diffracted by the static grating 360. Transmitted beam 410 is further diffracted by the static grating 360. Transmitted beam 410 is transmitted through the transparent region 370. The diffracted beam and the transmitted beam comprise the output beams 440, 430. The optical power in input beam 310 is variably divided into the two outputs 430 and 440 by setting the switchable grating 320 to a predetermined diffraction efficiency which is determined by the switching control 315 (voltage, in one embodiment). The switchable grating 320 is set to either substantially fully diffracting, substantially fully transmitting, or some intermediate state of diffraction efficiency by the control 315 (voltage, in one embodiment). It should be noted that by setting the switchable grating 320 to either substantially fully diffracting or substantially fully transmitting, the transmitted beam can be substantially absent or the diffracted beam can be substantially absent.

It should be noted that, in the embodiments of FIGS. 4a, 4b, and 5, the static grating may be, but is not limited to, a volume diffraction grating or may be replaced by a switchable volume diffraction grating.

It should also be noted that the switchable gratings of this invention may be volume holographic gratings, but may also be switchable gratings of other types including switchable surface relief gratings.

Although the invention has been described with respect to various embodiments, it should be realized this invention is also capable of a wide variety of further and other embodiments within the spirit and scope of the appended claims.

What is claimed is:

1. A method for switching one input optical beam to two output beams, the method comprising the steps of:
   providing a switchable volume diffraction grating;
   providing a static grating having a transparent region;
   enabling said switchable volume diffraction grating to diffract, with a predetermined diffraction efficiency, the input optical beam into a diffracted beam and a transmitted beam;
   diffracting, with a predetermined diffraction efficiency, the input beam into a diffracted beam and a transmitted beam;
   diffracting the diffracted beam utilizing the static grating; and,
   transmitting the transmitted beam through said transparent region;
   wherein the diffracted beam and the transmitted beam comprise the two output beams.

2. The method of claim 1 wherein enabling said switchable volume diffraction grating to diffract comprises configuring the switchable volume diffraction grating in a desired state.

3. The method of claim 1 wherein enabling said switchable volume diffraction grating to diffract comprises applying a control signal.

4. The method of claim 3 wherein applying a control signal comprises one of an optical signal and an electrical signal.

5. The method of claim 4 wherein one of the optical signal and the electrical signal result in switching times of approximately a microsecond.

6. The method of claim 1 wherein enabling said switchable volume diffraction grating to diffract comprises applying a polarization control.

7. The method of claim 1 further comprising:
   using the switchable volume diffraction grating to controllably attenuate the intensity of the diffracted beam.

* * * * *